US006855896B2

United States Patent
Oikawa

(10) Patent No.: US 6,855,896 B2
(45) Date of Patent: Feb. 15, 2005

(54) VEHICULAR SWITCH

(75) Inventor: Takahiro Oikawa, Tokyo (JP)

(73) Assignee: Niles Parts Co., Ltd. (JP)

( * ) Notice: Subject to any disclaimer, the term of this patent is extended or adjusted under 35 U.S.C. 154(b) by 91 days.

(21) Appl. No.: 10/464,454

(22) Filed: Jun. 19, 2003

(65) Prior Publication Data

US 2003/0234164 A1 Dec. 25, 2003

(30) Foreign Application Priority Data

Jun. 25, 2002 (JP) .................................... P2002-184722

(51) Int. Cl.[7] ............................................. H01H 15/00
(52) U.S. Cl. ............. 200/61.54; 200/11 D; 200/11 DA; 200/336
(58) Field of Search ................ 200/4, 5 R, 11 R–11 H, 200/61.54, 570, 571, 336

(56) References Cited

U.S. PATENT DOCUMENTS

| | | | | |
|---|---|---|---|---|
| 5,107,243 A | * | 4/1992 | Maeda ..................... | 200/61.54 |
| 5,546,087 A | * | 8/1996 | Martin Neira ............. | 342/120 |
| 5,854,458 A | * | 12/1998 | Ramamurthy et al. ... | 200/61.54 |
| 6,365,852 B1 | * | 4/2002 | Leng et al. ............... | 200/61.54 |
| 6,441,327 B1 | * | 8/2002 | Shibata et al. ........... | 200/61.27 |
| 6,534,733 B2 | * | 3/2003 | Schwartz et al. ........ | 200/61.54 |

* cited by examiner

Primary Examiner—Michael A. Friedhofer
(74) Attorney, Agent, or Firm—Rader, Fishman & Grauer PLLC

(57) ABSTRACT

In a vehicular lever switch having a resistor at a fixed contact plate to be combined with a pivoting knob, when a passenger charged with static electricity touches the lever, the resistor is to be prevented from being damaged. A fixed contact plate is arranged with a resistor and conductors and extended from both ends thereof in a ring-like shape to constitute a fixed contact. Further, an extended portion extended in a circular arc shape is formed on an outer side of the resistor with a gap from the conductor. Even when the hand of a passenger charged with static electricity touches a vicinity of a pivoting knob and the static electricity is applied to the fixed contact plate, the static electricity flows to the extended portion and is discharged via the conductor and a terminal. Thereby, the resistor is not damaged by static electricity. Further, it is not necessary to ensure a distance from an end edge of the pivoting knob to the fixed contact plate to be long in order to avoid propagation of static electricity and therefore, a degree of freedom of a shape of the lever can be enhanced.

3 Claims, 5 Drawing Sheets

Prior Art Fig.5
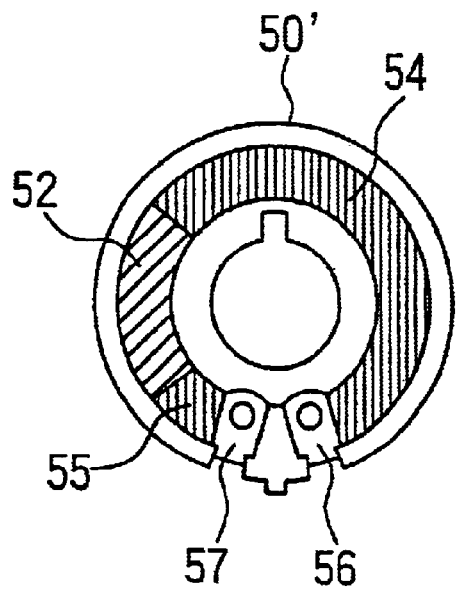

VEHICULAR SWITCH

BACKGROUND OF THE INVENTION

1. Field of the Invention

The present invention relates to a vehicular switch particularly having a pivoting knob of, for example, a lever switch of a combination switch installed at a steering column of a vehicle or the like.

2. Description of Related Art

In a lever switch of a combination switch or the like of a vehicle, a lever per se is used as an operating portion of a turn signal switch or a passing switch and is also used as a dimmer switch by providing a pivoting knob at the lever or for controlling a wiper speed.

FIG. 4 is a sectional view showing a structure of a front end portion of a lever switch having a middle pivoting knob at a middle portion for controlling a wiper speed for, for example, controlling intermittent time in an intermittent mode of the wiper including a surrounding of the middle pivoting knob in the lever.

In a lever 10', a shaft portion 12 is extended from a lever main body portion 11' to a front end thereof and a front end fixing block 20 and a middle fixing block 30 are respectively provided at a front end and a middle of the shaft portion 12. Between the middle fixing block 30 and the lever main body portion 11', a middle pivoting knob 40' for controlling the wiper speed is pivotably provided around the shaft portion 12.

The middle pivoting knob 40' comprises an operating ring portion 41, both ends of which are in an axial direction and are supported by an end edge on a side of a lever main body of the middle fixing block 30 and an end edge of the lever main body portion 11' and a movable contact holding block 42' on an inner side thereof. The movable contact holding block 42' is extended from a side edge on a side of the lever main body portion 11' into the lever main body portion by a predetermined length and is provided with a movable contact 43 at an end face thereof.

A fixed contact plate 50' is fixed at the lever main body portion 11' to be opposed to the movable contact 43 of the movable contact holding block 42'.

The movable contact holding block 42' is further provided with a ball hole 46 opened to a side of the middle fixing block 30, holds a ball 48 urged by a spring 47 and presses the ball 48 to a cam 31 provided at the middle fixing block 30.

As shown by FIG. 5, the fixed contact plate 50' is provided with a resistor 52 in a circular arc shape and conductors 54 and 55 extended from both ends thereof on a plate face thereof. Further, the resistor 52 and the conductors 54 and 55 constitute a ring-like shape as a whole and terminals 56 and 57 at both ends thereof are connected to lead wires (not illustrated).

The resistor 52 is formed by coating a paste comprising a mixing agent of resin and carbon.

The movable contact 43 includes an arm extended in a circular arc shape and is arranged such that one end thereof slides on the resistor 52 of the fixed contact plate 50 and the other end thereof slides on the conductor 54.

Thereby, when the intermediate pivoting knob 40' is pivoted, a position of the arm of the movable contact 43 on the resistor 52 is changed and a resistance value between the terminals 56 and 57 of the fixed contact plate is changed.

A front end portion of the lever 10' is also provided with a front end pivoting knob 70 attached to a pivoting block 60 between the front end fixing block 20 and the middle fixing block 30 and a fixed contact plate 75 and the pivoting block 60 is provided with a movable contact.

Meanwhile, according to the conventional lever switch having the above-described constitution, depending on conditions, there poses a problem that when a passenger charged with static electricity touches a vicinity of the middle pivoting knob 40 for operation, the static electricity is applied to the resistor 52 of the fixed contact plate 50' and the resistor 52 is damaged.

For example, static electricity applied to a vicinity of an end portion B of the middle pivoting knob 40 propagates in air having small resistance and escapes to the fixed contact plate 50' by passing a gap between the middle pivoting knob 40' and the lever main body portion 11'.

At this occasion, when the static electricity is applied to a central position in a peripheral direction of the resistor 52 of the fixed contact plate 50', the resistance of the resistor 52 is maximized against the static electricity escaping to the conductors 54 and 55 at the both ends, heat is generated and a resin component of the resistor 52 is burnt.

Therefore, although a variable range of the resistance value by the resistor 52 is set to, for example, 0Ω through 1 kΩ, the variable range is changed to 0Ω through 700Ω and operation of the wiper set to predetermined minimum speed cannot be carried out and a drawback that the wiper cannot be used at fast speed is brought about.

In order to avoid such a phenomenon, it is necessary to increase a distance d from an end edge of the lever main body portion 11' to the fixed contact plate 50', shown in FIG. 4, as large as possible.

However, when the distance d is increased, a degree of freedom of the shape of the lever is lost, and the distance d cannot sufficiently be ensured in relation with arrangement of an inner structure.

When a resistor is also provided at the fixed contact plate 75 for the front end pivoting knob 70, a similar problem occurs.

SUMMARY OF THE INVENTION

Therefore, in view of the above-described problem, it is an object of the invention to provide a vehicular switch capable of preventing a fixed contact plate from being damaged by static electricity even when a distance d between a fixed contact plate and an end edge of a fixed side member of a lever main body portion for fixing the fixed contact plate or the like is small.

For that object, according to the invention, in a vehicular switch in which a pivoting knob is provided pivotably to a fixed side member of a lever main body portion or the like and a fixed contact plate having a fixed contact, including a resistor, is fixed to the fixed side member to be opposed to a movable contact on a side of the pivoting knob, the fixed contact plate is provided with a protective electrode on an outer side in a radius direction of the resistor to connect to a terminal of the fixed contact.

BRIEF DESCRIPTION OF THE DRAWINGS

FIG. 5 is an enlarged front view showing a fixed contact plate according to the conventional example.

DESCRIPTION OF PREFERRED EMBODIMENTS

An explanation will be given of an embodiment of the invention as follows.

Figure 1:
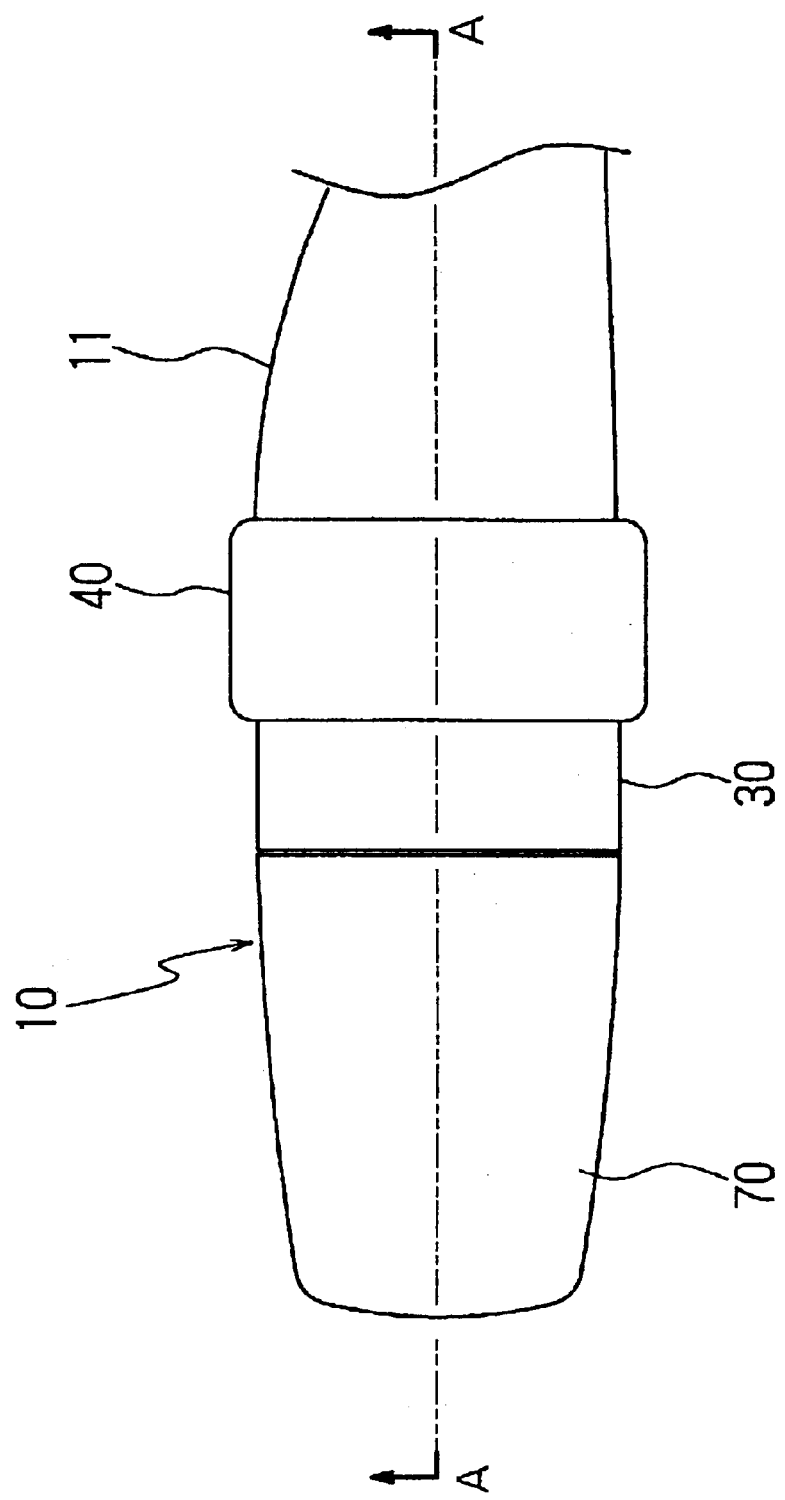
FIG. 1 is an outlook view of a portion on a side of a lever front end of a lever switch according to an embodiment of the invention.
Figure 2:
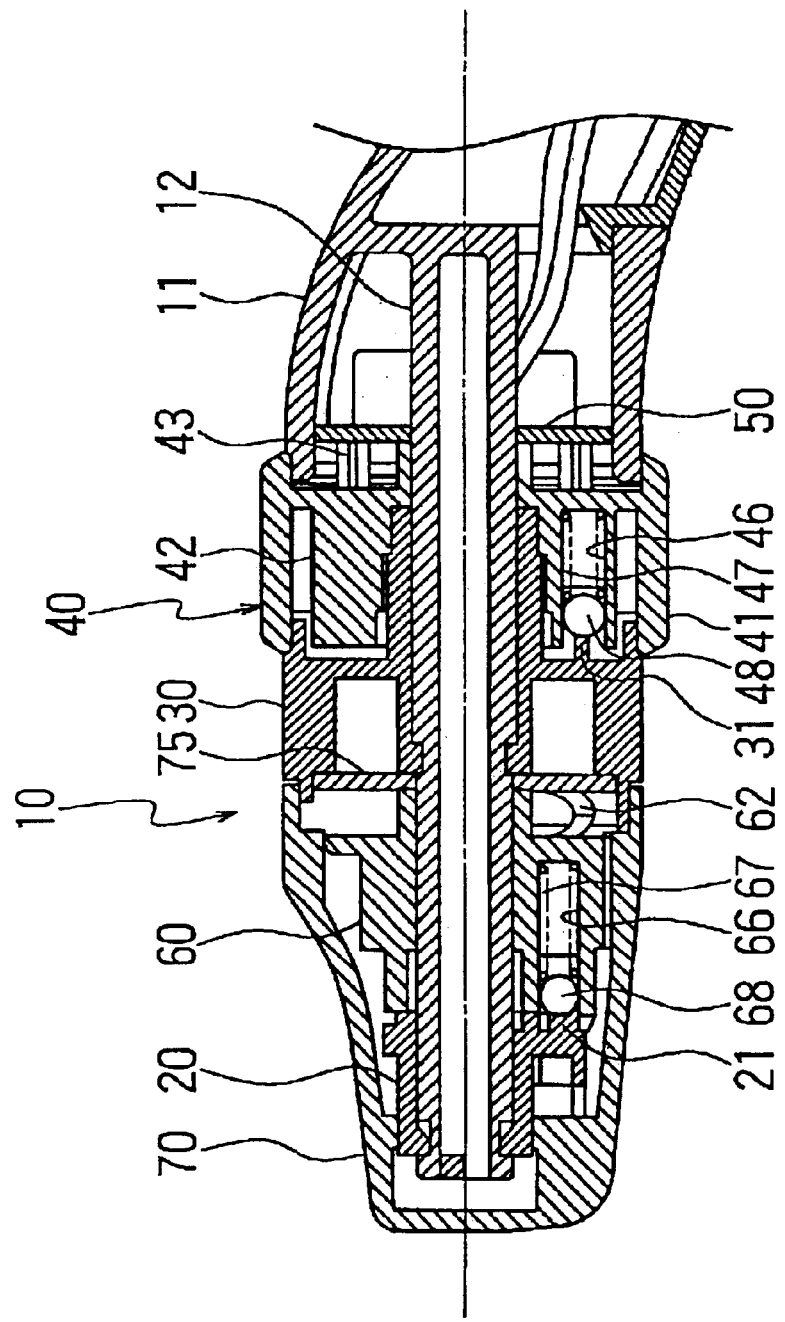
FIG. 2 is a sectional view taken along a line A—A of FIG. 1.

FIG. 1 is an outlook view of a portion of a lever front end side of a lever switch according to the embodiment and FIG. 2 is a sectional view taken along a line A—A of FIG. 1.

A front end and a middle of the shaft portion 12 of a lever 10 are respectively fixed with a front end fixing block 20 and the middle fixing block 30.

Between the middle fixing block 30 and a lever main body portion 11, a middle pivoting knob 40 for controlling a wiper speed is provided pivotably around the shaft portion 12.

The middle pivoting knob 40 comprises the operating ring portion 41, both ends of which are in an axial direction and are supported by an end edge on a side of the lever main body portion of the middle fixing block 30, an end edge of the lever main body portion 11 and a movable contact holding block 42 on an inner side thereof. The movable contact holding block 42 is provided with the movable contact 43 at an end face thereof on the side of the lever main body portion.

The movable contact holding block 42 is further provided with the ball hole 46 opened to the side of the intermediate fixing block 30, holds the ball 48 urged by the spring 47 and presses the ball 48 to the cam 31 provided at the middle fixing block 30.

Further, between the front end fixing block 20 and the middle fixing block 30, the pivoting block 60, pivotable around the shaft portion 12, is provided and the front end pivoting knob 70 covering from the front end of the shaft portion 12 is connected to the pivoting block 60. The pivoting block 60 is provided with the movable contact 62 at an end face thereof on the side of the middle fixing block 30. Further, the middle fixing block 30 is fixed with the fixed contact plate 75 to be opposed to the movable contact 62 of the pivoting block 60.

The pivoting block 60 is further provided with the ball hole 66 opened to the side of the front end fixing block 20, holds the ball 68 urged by the spring 67 and presses the ball 68 to the cam 21 provided at the front end fixing block 20.

Figure 4:
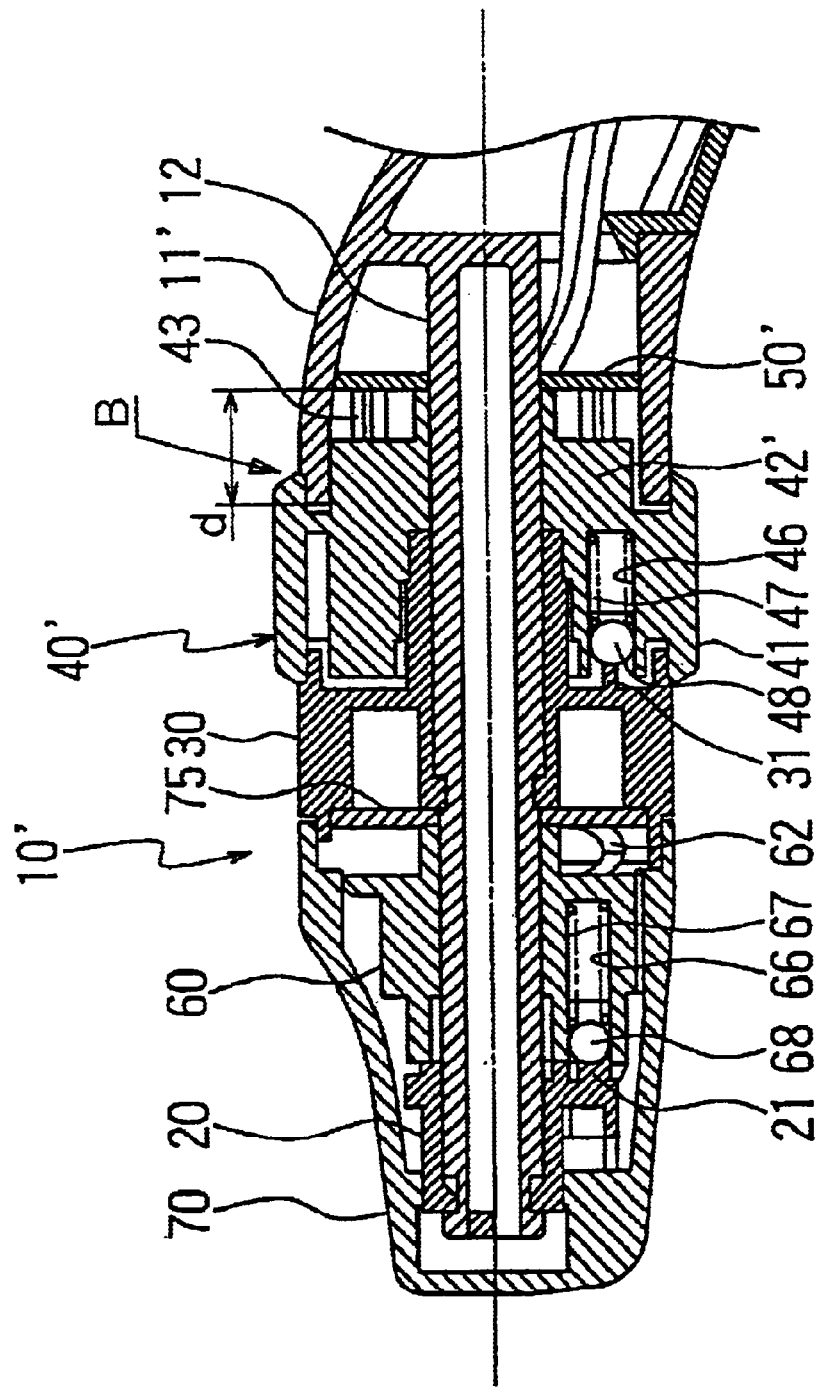
FIG. 4 is a view showing a conventional example.

The above-described constitution is similar to the conventional example of FIG. 4 except that an end face attached with the movable contact 43 of the movable contact holding block 42 is not extended into the lever main body portion 11.

Next, a fixed contact plate 50 is fixed to the lever main body portion 11 to be opposed to the movable contact 43 of the movable contact holding block 42.

Figure 3:
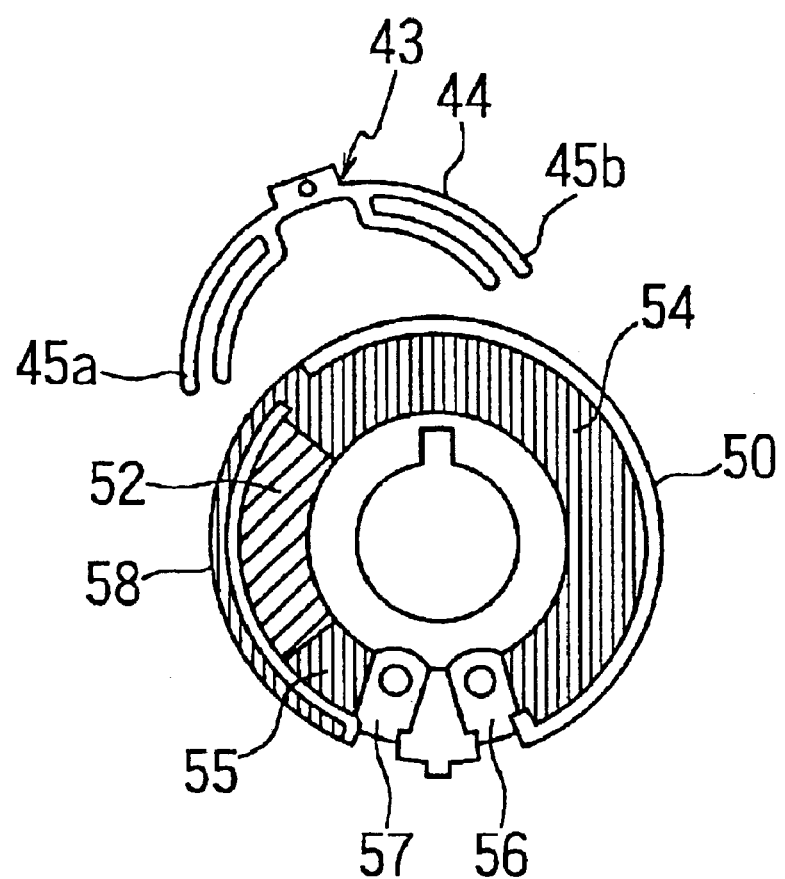
FIG. 3 is an enlarged front view showing details of a fixed contact plate.

As shown by FIG. 3, the fixed contact plate 50 is provided with the resistor 52 and the conductors 54 and 55 extended from both ends on the plate face. Further, the resistor 52 and the conductors 54 and 55 constitute a ring-like shape as a whole and the terminals 56 and 57 at both ends are connected to lead wires (not illustrated).

A longer one of the conductor 54 is offset from a portion thereof connecting to the resistor 52 to an outer side, and outer sides in the radius direction of the resistor 52 and a shorter one of the conductor 55 are extended in a circular arc shape to form an extended portion 58 as a protective electrode. A front end of the extended portion 58 is disposed at a vicinity of an end portion on the side of the terminal 57 of the conductor 55 with a gap from the resistor 52 and the conductors 54 and 55.

The movable contact 43 includes an arm 44 extended in a circular arc shape and is arranged such that one end 45a thereof slides on the resistor 52 of the fixed contact plate 50 and the other end 45b thereof slides on the conductor 54. Thereby, when the middle pivoting knob 40 is pivoted, a position of the arm 44 of the pivotable contact 43 on the resistor 52 is changed and a resistance value between the terminals 56 and 57 of the fixed contact plate 50 is changed.

According to the embodiment, in the fixed contact plate 75 fixed to the middle fixing block 30, a plurality of fixed contacts connected to predetermined terminals are provided, although not particularly illustrated, and a change-over switch is constituted such that a fixed contact to which the movable contact 62 of the pivoting block 60 is connected and is changed by pivoting the front end fixing block 20.

The embodiment is constituted as described above, at the middle pivoting knob 40 for controlling the wiper speed, the resistor 52 and the conductors 54 and 55 extended from both ends are arranged in a ring-like shape at the fixed contact plate 50 to be combined with the movable contact 43 to constitute the fixed contact, and the outer side of the resistor 52 is formed with the extended portion 58 extended in the circular arc shape with a gap from the longer one of the conductor 54. Therefore, even when the hand of a passenger charged with static electricity touches the lever 10 at a vicinity of the fixed contact plate 50, the static electricity flows to the extended portion 58 as the protective electrode before being applied to the resistor 52 and discharged via the conductor 54. Therefore, since the resistor 52 is not damaged by static electricity, a function sets for controlling the wiper speed is not deteriorated in the market.

Further, it is not necessary to ensure the distance d from the end edge of the lever main body portion to the fixed contact plate as shown by the conventional example, and, therefore, the degree of freedom of the shape of the lever can be enhanced.

Further, although according to the embodiment the extended portion 58 in the fixed contact plate 50 is extended to the vicinity of the end portion on the side of the terminal 57 of the conductor 55, in order to protect the resistor 52, the extended portion 58 may be extended at least to a position in correspondence with the end portion of the resistor 52.

Further, although the extended portion 58 is extended from the longer one of the conductor 54, the extended portion 58 can also be extended from the shorter one of the conductor 55.

Further, although the extended portion 58 is electrically communicated with the terminal 56 via the conductor 54 to discharge static electricity, the extended portion 58 may not be extended from, for example, the conductor 54 but may directly be extended from the terminal 56. When the resistor 52 is directly connected to the terminal 56 or 57, naturally, the extended portion 58 is connected to the terminal 56 or 57.

Furthermore, although an explanation has been given of a constitution with regard to the middle pivoting knob 40 for controlling wiper speed as the fixed contact plate 50 having the resistor 52, the embodiment is not limited thereto but may also be applied to other fixed contact plates related to other pivoting knob, including the front end pivoting knob 70, when the resistor is provided, the extended portion can similarly be formed.

Further, although according to the embodiment, an explanation has been given of an example of applying to the lever switch, the embodiment is not limited thereto but the invention is applicable to various vehicular switches other than the lever switch.

As described above, according to the invention, in a vehicular switch in which a fixed contact plate having a fixed contact including a resistor is fixed to a fixed side member to be opposed to a movable contact on a side of a pivoting knob, the fixed contact plate is provided with a protective electrode on an outer side in a radius direction of the resistor to connect to a terminal of the fixed contact. Therefore, even-when the hand of a passenger charged with static electricity touches the lever at a vicinity of the fixed contact plate, the static electricity is discharged from the protective electrode via the terminal and the resistor is not applied with the static electricity. Therefore, since the resistor is not damaged, a switching function based on the resistor can safely be protected.

What is claimed is:

1. A vehicular switch in which a pivoting knob is provided pivotably relative to a fixed side member and a fixed contact plate having a fixed contact including a resistor is fixed to the fixed side member to be opposed to a movable contact on a side of the pivoting knob, the fixed contact plate being provided with a protective electrode electrically connected to a terminal of the fixed contact and arranged on an outer side in a radius direction of the resistor with respect to a pivoting axis of the pivoting knob.

2. The vehicular switch according to claim 1, wherein the fixed contact includes a conductor connecting the resistor and the terminal and the protective electrode is electrically connected to the terminal via the conductor.

3. The vehicular switch according to claim 2, wherein the fixed contact is extended in a circular arc shape in a peripheral direction with respect to a pivoting axis of the pivoting knob and the protective electrode is extended in correspondence with at least a total length of the resistor.

* * * * *